United States Patent [19]

Pease et al.

[11] 4,424,434
[45] Jan. 3, 1984

[54] BOILER TUBE WEARBAR, STUD AND ARC SHIELD

[75] Inventors: Charles C. Pease, Vincentown; Eugene P. Schaeffer, Marlton, both of N.J.

[73] Assignee: Omark Industries, Inc., Portland, Oreg.

[21] Appl. No.: 207,665

[22] Filed: Nov. 17, 1980

[51] Int. Cl.³ ............................................. B23K 9/20
[52] U.S. Cl. .................................. 219/99; 29/402.13; 219/98
[58] Field of Search .................................. 219/98, 99; 122/DIG. 13, DIG. 16; 29/402.07, 402.13

[56] References Cited

U.S. PATENT DOCUMENTS

| | | | |
|---|---|---|---|
| 2,512,033 | 6/1950 | Metz | 29/402.13 |
| 3,291,438 | 12/1966 | Logan | 219/99 X |
| 3,774,009 | 11/1973 | Hodges | 219/98 |
| 3,781,965 | 1/1974 | Bone | 29/402.13 |

FOREIGN PATENT DOCUMENTS

| | | | |
|---|---|---|---|
| 2212209 | 7/1974 | France | 219/98 |
| 1075969 | 7/1967 | United Kingdom | 219/99 |
| 1368846 | 10/1974 | United Kingdom | 219/99 |

OTHER PUBLICATIONS

Nelson, "TRW Nelson Division", Add Brochure 3/74 Lorain, Ohio.

Primary Examiner—B. A. Reynolds
Assistant Examiner—Alfred S. Keve
Attorney, Agent, or Firm—Duffield & Lehrer

[57] ABSTRACT

Apparatus and methods for replacing or repairing missing or damaged abrasion resistant wearbars utilized in high velocity cyclone boilers. A retrofit wearbar having an aperture therein is utilized in conjunction with an end weldable stud wherein the wearbar and stud are placed in position over a damaged wearbar or against the boiler tube in the case of a missing wearbar and the stud end welding technique utilized to fuse the wearbar and stud in place with the damaged wearbar or boiler tube in the case of a missing wearbar in situ. An arc shield is utilized which has a projection from the weld fillet cavity thereof which cooperates in conjunction with the aperture of the retrofit wearbar to provide alignment of the stud in the wearbar and prevent shorting of the stud to the wearbar during the welding cycle.

14 Claims, 6 Drawing Figures

BOILER TUBE WEARBAR, STUD AND ARC SHIELD

BACKGROUND OF INVENTION

In such industries as power generation and particularly in large boiler applications, the air and fuel passing across the boiler tubes within the boiler during entrance and combustion through the boiler can cause severe abrasion and wearing of the surface of the boiler tubes resulting in their early failure and need for replacement. One example of such a high wear characteristic is the cyclone boilers.

Cyclone boilers are generally very large boilers which utilize one or more cyclones at the entrance to the boiler. The cyclones are devices into which extremely high velocity air and fuel are passed in a swirling or cyclone manner around boiler tubes. Primary combustion occurs within the cyclones and the hot gases emerging therefrom are passed upwardly through the main chamber of the boiler.

In some applications, the air velocity within the cyclone can reach velocities in the range of 600 miles per hour. This high air velocity together with the fuel, either oil or coal, being carried with the air creates severe abrading action against the faces of the boiler tubes against which the air fuel combination directly impinges.

One manner in which the boiler tubes within the cyclone are protected from the abrading action of the air fuel mixture in existing boilers is by the use of rectangular wearbars secured to the boiler tubes in a position transverse to the direction of flow of the air fuel so as to protect the boiler tube. FIG. 1 of the drawing illustrates the manner in which a plurality of wearbars 10 are secured to the exterior surface 11 of a boiler tube. The wearbars 10 may be of a wear resistant material such as 310 stainless steel.

During the manufacture of the cyclone portion of the boiler, the wearbars 10 are secured to the boiler tubes during fabrication. Different methods of securing the wearbars to the boiler tube sections during fabrication may be utilized including resistance welding or hand welding. Fabrication by these means is relatively simple during the fabrication stage at the factory during which the various boiler tube segments are disassembled. However, once the cyclone portion of the boiler is assembled at the plant site, the maze of boiler tubes does not readily lend to easy access, repair and replacement of the wearbars.

During operation of the boiler, the continued impingement of the air fuel mixture against the wearbars will eventually erode the wearbars to the point that replacement is required. Accordingly, there are periodic shutdowns of the boiler during which the cyclone is entered and the state of the wearbars examined. Due to the different degrees of impingement of the air fuel mixture upon different portions of the wearbars, some of the wearbars may be only slightly worn whereas others may be excessively worn or even totally missing from the boiler tube. In those cases, either repair or replacement is necessary as the case dictates.

Disassembly of those boiler tubes having damaged wearbars is impractical and too costly. Accordingly, the preferred course of action is to repair the damaged wearbars in situ. Heretofore, this has been accomplished by taking similar wearbars and handwelding them to the worn wearbars or, in the case of missing wearbars, handwelding the wearbars to the boiler tube itself. As is illustrated in FIG. 1, a replaced wearbar 13 is shown wherein handwelding by means of electric arc welding or stick welding as it is known is accomplished by means of puddling a welding pool through an opening 14 provided in replacement wearbars as heretofore used. This procedure is time consuming and thus costly.

OBJECTS AND SUMMARY OF INVENTION

It is the object of the present invention to provide a quick, economical and efficient manner of securing wearbars to boiler tubes for repair or replacement of damaged or missing wearbars in situ utilizing the stud end welding technique.

The foregoing object is carried out in the present invention by means of a retrofit wearbar of a configuration generally the same as the wearbars being repaired or replaced. The retrofit wearbar includes an aperture therein of generally circular configuration. An end weldable stud of a diameter slightly less than the aperture of the wearbar and adapted to pass therethrough is utilized in conjunction with an arc shield to permit the wearbar and stud to be welded by the stud end welding technique to the existing wearbar to be repaired or to the boiler tube in the case of a missing wearbar.

The retrofit wearbar may be flat on one face in those cases where the retrofit wearbar is welded over worn wearbars and may have a concave configuration corresponding to the exterior surface of the boiler tube for mating therewith in the case where the retrofit wearbar is used to replace an existing but missing wearbar.

The arc shield may include a projection from the weld fillet cavity thereof which cooperates with the aperture of the retrofit wearbar to provide alignment of the stud within the aperture to prevent shorting of the stud to the retrofit wearbar.

Other objects and advantages of the present invention will become apparent to those skilled in the art from the detailed description thereof which follows.

DETAILED DESCRIPTION OF INVENTION

Figure 1:
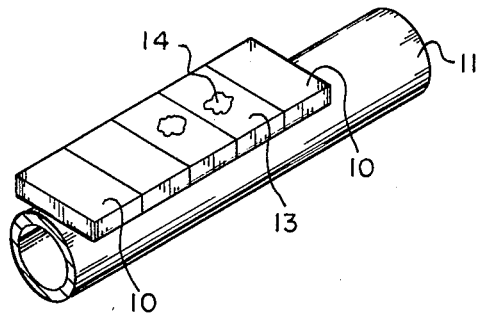
FIG. 1 illustrates the existing wearbars and heretofore handwelded retrofit wearbars of the prior art.
Figure 2:
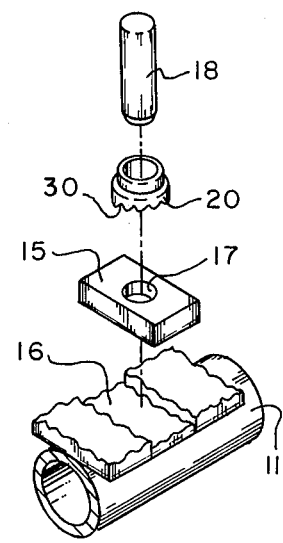
FIG. 2 is an exploded perspective view of the wearbar and stud combination of the present invention for use in repairing existing wearbars.
Figure 3:
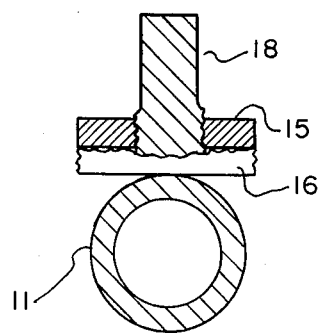
FIG. 3 is an end perspective view of the assembly of FIG. 2 following welding.

FIGS. 2 and 3 illustrate the embodiment of retrofit wearbar 15 utilized for repair of existing wearbars. The existing wearbar 16 in the case of the embodiment of FIGS. 2 and 3 will generally have been burned down to a point that it will not survive the next operational cycle of the boiler. However, it is not generally desired to tear the wearbars away from the boiler tube 11 and thus it is preferable to weld another wearbar on top of the worn existing wearbar 16 to reinforce the wearbar for the next operational cycle.

The retrofit wearbar 15 is flat on its under surface so as to generally conform to the upper surface of the existing worn wearbar 16. The wearbar 15 includes an aperture 17 therein generally centrally of the wearbar.

An end weldable stud 18 is provided. This stud is generally of the type utilized in the arc stud welding technique and may include appropriate flux on the end thereof as desired. The stud 18 is of a diameter or configuration slightly smaller than the aperture 17 in the wearbar 15.

An arc shield 20 is provided which, during the welding operation, will surround the stud 18 and come into engagement with the upper surface of the wearbar 15. The arc shield 20 includes gas vents 30 therein. The arc shield functions, in the embodiment of FIGS. 2 and 3, in the heretofore known manner to provide shielding of the arc from the operator and to contain the molten metal generally within the aperture 17 and within an inner circumferential weld fillet cavity (not shown) within the arc shield 20.

The wearbar 15 is generally of a length and width and thickness similar to that of the existing wearbars 10. In this manner, the wearbar 15 may fit between adjacent wearbars directly on top of the worn wearbar 16. Thereafter, the arc shield 20 is positioned in place over the aperture 17 and the stud 18 inserted through the arc shield 20 through the aperture 17 into contact with the existing and worn wearbar 16.

The stud 18 is carried in the chunk of a conventional handheld stud welding gun. Likewise, the arc shield 20 is carried in the art shield holder and serves to provide the vertical spacing of the stud 18 with respect to the wearbar 15. The welding operation is then carried out in the normal handheld stud end welding technique wherein the stud 18 contacts the surface of the existing wearbar 16, is then lifted during an arc portion of the cycle during which contiguous portions of the stud and wearbar 16 are melted and thereafter plunged into the molten pool of metal. The molten pool of metal, by reason of the arc, has also moved through a portion of the wearbar 15 and the resultant plunge creates a fusion bond between the stud 18, wearbar 15 and existing wearbar 16 thus interlocking the members together.

FIG. 3 illustrates the resultant bond of the stud 18, retrofit wearbar 15 and existing wearbar 16 following the weld cycle.

Figure 5:
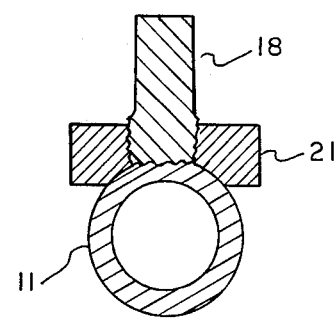
FIG. 5 is an end sectional view of the assembly of FIG. 4 following welding.
Figure 4:
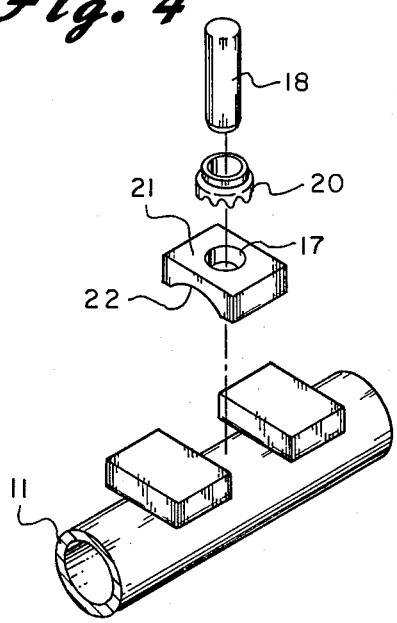
FIG. 4 is an exploded perspective view of the wearbar and stud assembly of the present invention for use in welding to a boiler tube in the case of a missing existing wearbar.

FIGS. 4 and 5 illustrate the embodiment of the wearbar of the present invention which may be utilized to replace an existing wearbar which has either been removed or has become disengaged from the boiler tube. In the embodiments of FIGS. 4 and 5, the same end weldable stud 18 and arc shield 20 are utilized. Likewise, the wearbar 21 is essentially the same as the wearbar 15 for replacement over existing wearbars as respects its length and width and the aperture therein but does differ on its underface. The underface 22 of the wearbar 21 has formed therein an arcuate or concave surface corresponding to the exterior surface of the boiler tube 11. In this manner, when the wearbar 21 is placed in position upon the boiler tube 11, the concave surface 22 will mate with the circular exterior surface of the boiler tube 11 and thus present a tight fit. This tight fit is beneficial during the welding cycle to maintain the molten metal within the aperture to provide a more complete bond.

The stud welding apparatus and welding techniques for the embodiments of FIGS. 4 and 5 are the same as that for FIGS. 2 and 3. Shown in FIG. 5 is the wearbar 21 after the stud 18 has been welded in place. As may be seen from FIG. 5, the stud 18 is fusion bonded to the boiler tube 11 and also has been fusion bonded to the wearbar 21 to provide an integrated assembly. In both of the embodiments of FIGS. 3 and 5, the arc shield 20 has been removed and discarded following the welding cycle.

Figure 6:
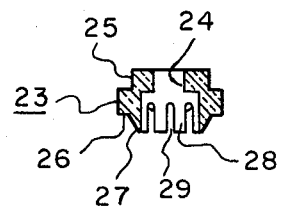
FIG. 6 is a side sectional view of the arc shield of the present invention.

In FIG. 6 there is shown a modified arc shield 23 which is beneficial in use with the wearbar and stud combination of the present invention. The arc shield 23 includes a central bore 24 therethrough which is just slightly larger than the diameter of the stud 18. The upper portion 25 of the arc shield is of a reduced diameter and is adapted to be engaged by the arc shield holder of the stud welding gun.

The lower portion of the arc shield 23 includes a horizontal shoulder 26 which is adapted to engage the upper surface of the wearbar to position the arc shield with respect to the stud and stud welding gun. Projecting inwardly and downwardly from the shoulder 26 is a conical or frusto conical projection 27 whose greater circumference approximates the diameter of the aperture 17 within the wearbar. The projection 27 permits the arc shield to readily be positioned in the aperture 17 and to center within the aperture 17. Centering of the arc shield 23 within the aperture automatically centers the stud 18 with respect to the aperture by reason of the concentricity of the bore 24 and the projection 27. Centering of the stud within the aperture 17 will insure against arcing of the stud 18 against the walls of the aperture 17 of the wearbar.

The arc shield 23 further includes a weld fillet cavity 28. This weld fillet cavity functions to absorb excess molten metal moving upwardly through the aperture 17 during the welding cycle and to form a weld fillet around the stud 18. Additionally, the arc shield 23 includes a plurality of vents 29 positioned around the circumference of the arc shield and extending through the wall of the arc shield from the interior to the exterior thereof. The vents 29 serve to provide a route of escape of gases generated during welding cycle from within the arc shield to the exterior thereof while reducing and maintaining the splatter and flash to a minimum.

By way of example in a particular embodiment, the wearbar 21 will be of $\frac{3}{8}$" thickness and 1" by $\frac{3}{4}$" rectangle. The wearbar 15 is somewhat thinner and approximately 3/16" in thickness. Both wearbars are preferably made of 304 stainless steel.

The stud 18 utilized as a $\frac{3}{8}$" diameter fluxed stud formed of 430 stainless steel. The aperture 17 in the wearbars is formed for approximately 1/16" clearance each side of the stud. The arc shield 23 is of a ceramic material.

From the foregoing description of the present invention, it will be appreciated that the wearbar and stud combination as well as the novel arc shield provides a quick and efficient manner by which worn or missing wearbars may, in situ, be repaired or replaced.

The present invention has been described in respect to the particular embodiments thereof shown in the drawing and as described in the specification. However, it is to be understood that other variations and modifications of the invention will now become apparent to those skilled in the art by means of the foregoing disclosure of the invention and therefore, the scope of the invention is not to be limited to the particular embodiment shown but is to be determined in view of the appended claims.

What is claimed is:

1. A retrofit wearbar-stud system for use in heating apparatus employing high velocity intermixed air and fuel impinging upon members such as boiler tubes during combustion and wherein the members include on their exterior surface a plurality of existing wearbars providing resistance against abrasion from the high velocity air and fuel, the wearbar system comprising, in combination:
   a retrofit wearbar formed of heat and abrasion resistant material and having an aperture therein; and
   an end weldable stud of configuration generally complementary to and slightly smaller than the aperture and capable of passing through the aperture whereby, when the wearbar and stud are placed in position of a damaged or missing wearbar and welded by the stud welding technique, the stud, wearbar and boiler tube or existing wearbar fuse together while the aperture at least partially filled with molten metal.

2. The improvements of claim 1 wherein one surface of the retrofit wearbar is complementary to the existing wearbars to permit securing of a retrofit wearbar over an existing worn or damaged wearbar.

3. The improvement of claim 1 wherein one surface of the retrofit wearbar is of configuration complementary to the exterior configuration of the boiler tube to permit a retrofit wearbar to be secured in place on the boiler tube to replace a missing existing wearbar.

4. The improvements of claim 1 further including an arc shield surrounding the end weldable stud and having alignment means projecting from one end thereof to cooperate with the aperture in the retrofit wearbar to align the stud within the aperture.

5. The improvements of claim 4 wherein the arc shield further includes vent means permitting escape of gases generated during the welding of the stud.

6. In the method of repairing heating apparatus employing high velocity intermixed air and fuel impinging upon such members as boiler tubes during combustion and wherein the boiler tubes include on their exterior surface a plurality of existing wearbars providing resistance against abrasion from the high velocity air and fuel, the improvements in the method providing for in situ repair or replacement of damaged or missing wearbars comprising the steps of:
   placing a retrofit wearbar having an aperture therein over the position of the worn or missing wearbar; and
   placing an end weldable stud through the aperture of the wearbar in contact with the damaged wearbar or against the boiler tube and securing the retrofit wearbar in place by the stud end welding technique utilizing sufficient welding current to, at least, partially fill the aperture of the wearbar with the molten metal to fuse together the stud, wearbar and existing wearbar or boiler tube.

7. The improvements of claim 6 further including the step of utilizing an arc shield surrounding the stud and having alignment means projecting from one end of the arc shield and extending into the aperture of the retrofit wearbar to align the stud within the aperture during welding thereof to prevent shorting and arcing of the stud to the wearbar.

8. A wearbar-stud system for securing wearbars to boiler tubes and the like which boiler tubes are used in boilers, furnaces and like structures and where the wearbars protect the boiler tubes from abrasion by high velocity intermixed air and fuel, the wearbar-stud system comprising:
   a wearbar of a prescribed thickness and parametrical edge configuration formed of heat and abrasion resistant material;
   an aperture through the wearbar; and
   an end weldable stud of length in excess of the thickness of the wearbar and of cross section generally complementary to and slightly smaller than the aperture of the wearbar whereby, when the wearbar is placed upon a boiler tube or an existing wearbar and the stud inserted into the aperture and stud welded, the aperture at least partially fills with molten metal to substantially fuse the stud, wearbar and boiler tube or existing wearbar one to another to thus secure the wearbar in place.

9. The wearbar-stud system of claim 8 further including an arc shield adapted to be positioned around the end weldable stud and having alignment means projecting from one end thereof to cooperate with the aperture in the wearbar to align the studs within the aperture of the wearbar.

10. The wearbar-stud system of claim 9 wherein the arc shield further includes vent means permitting escape of gases generated during the welding of the end weldable stud.

11. The wearbar-stud system of either claims 8 or 9 wherein the wearbar is of substantially uniform thickness and one surface thereof is complementary to the existing wearbars to which the wearbar is to be secured to permit securing of wearbars over existing worn or damaged wearbars.

12. The wearbar-stud system of either claims 8 or 9 wherein one surface of the wearbar is flat and the opposing surface thereof includes a portion thereof of configuration complementary to the exterior configuration of the boiler tube to which the wearbar is to be secured to permit the wearbar to be secured in place on new boiler tubes or to replace a missing wearbar on pre-existing boiler tubes.

13. The method of securing wearbars to members such as boiler tubes used in furnaces and the like wherein the wearbars protect the boiler tubes from abrasion by high velocity air and fuel comprising the steps of:
   placing a wearbar having an aperture therein in position upon the boiler tube; and
   placing an end weldable stud through the aperture of the wearbar in contact with the boiler tube and securing the wearbar in place by stud welding the stud by the stud welding technique utilizing sufficient welding current to, at least, partially fill the aperture of the wearbar with molten metal to fuse together the stud, wearbar and boiler tube.

14. The method of claim 13 further including the step of utilizing an arc shield surrounding the stud and having alignment means projecting from one end of the arc shield and extending into the aperture of the wearbar to align the stud within the aperture during welding thereof to prevent shorting and arcing of the stud to the wearbar.

* * * * *